US008886945B2

(12) United States Patent
Gregotski

(10) Patent No.: US 8,886,945 B2
(45) Date of Patent: Nov. 11, 2014

(54) SYSTEM AND METHOD FOR CONVEYING SESSION INFORMATION FOR USE IN FORENSIC WATERMARKING

(75) Inventor: Mark E. Gregotski, Jamison, PA (US)

(73) Assignee: Motorola Mobility LLC, Libertyville, IL (US)

( * ) Notice: Subject to any disclaimer, the term of this patent is extended or adjusted under 35 U.S.C. 154(b) by 503 days.

(21) Appl. No.: 12/971,161

(22) Filed: Dec. 17, 2010

(65) Prior Publication Data

US 2012/0159174 A1    Jun. 21, 2012

(51) Int. Cl.
*H04L 9/32* (2006.01)
*H04N 21/8358* (2011.01)
*H04N 21/2362* (2011.01)
*H04N 21/2343* (2011.01)

(52) U.S. Cl.
CPC ... *H04N 21/234345* (2013.01); *H04N 21/8358* (2013.01); *H04N 21/2362* (2013.01)
USPC .......................................................... 713/176

(58) Field of Classification Search
None
See application file for complete search history.

(56) References Cited

U.S. PATENT DOCUMENTS

| | | |
|---|---|---|
| 6,285,774 B1 | 9/2001 | Schumann et al. |
| 7,142,691 B2 | 11/2006 | Levy |
| 2009/0080689 A1* | 3/2009 | Zhao et al. .................. 382/100 |
| 2009/0168773 A1* | 7/2009 | Crookes et al. ............... 370/389 |
| 2010/0169349 A1 | 7/2010 | Zou et al. |

OTHER PUBLICATIONS

PCT Search Report & Written Opinion, RE: Application #PCT/US2011/064037; Jun. 12, 2012.
ISO/IEC, "ISO/IEC 13818-1. Information Technology—Generic Coding of Moving Pictures and Associated Audio Information: Systems. // Technologies De L'Information—Codage Generique Des Images Animees et du son Associe: Systemes—Recommendation ITU-T H.222.0 (2000E)", International Standard ISO/IEC, vol. 13818-1, Dec. 1, 2000.

* cited by examiner

*Primary Examiner* — Brandon Hoffman
(74) *Attorney, Agent, or Firm* — Lowenstein Sandler LLP

(57) ABSTRACT

Methods for providing content session information using a content manager, streaming server, and one or more watermarking devices are disclosed. A content asset is also disclosed. The content asset may include content. In addition, the content asset may include a content data field having forensic watermark information, e.g. session or identifying information. In one aspect, the content asset is compressed and the compressed content asset has one or more pre-processed candidate watermark locations. In this aspect, the forensic watermark information may be extracted, e.g. by a watermarking device, from the content data field and included in the one or more pre-processed candidate watermark locations.

34 Claims, 8 Drawing Sheets

| DATA STRUCTURE | BIT | IDENTIFIER *1 |
|---|---|---|
| program_map_section () { table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i < N; i++) {         descriptor ()     } | | |
|     for (i = 0; i < N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (j = 0; j < M; j++) {             descriptor ()         }     } | | |
|     CRC_32 | 32 | rpchof |
| } | | | bslbf     : bit string, left bit first
uimsbf     : unsigned Integer, most significant bit first
rpchof     : remainder polynomial coefficients, highest order first

FIG. 2

| Syntax | No. of bits | Identifier |
|---|---|---|
| registration_descriptor() { | | |
|     descriptor_tag | 8 | uimsbf |
|     descriptor_length | 8 | uimsbf |
|     format_identifier | 32 | uimsbf |
|     for (i = 0; i < N; i++){ | | |
|         additional_identification_info | 8 | bslbf |
|     } | | |
| } | | |

Registration Descriptor

FIG. 3

| Syntax | No. of bits | Identifier |
|---|---|---|
| private_data_indicator_descriptor() { | | |
| descriptor_tag | 38 | uimsbf |
| descriptor_length | 38 | uimsbf |
| private_data_indicator | 32 | uimsbf |
| } | | |

Private Data Indicator Descriptor

FIG. 4

SYSTEM AND METHOD FOR CONVEYING SESSION INFORMATION FOR USE IN FORENSIC WATERMARKING

BACKGROUND

To support new services, such as early window Video on Demand (VOD), content providers are requesting that Multiple System Operators (MSOs) provide content protection systems capable of inserting forensic watermarks into the output media. The watermark must contain sufficient information such that forensic analysis of a video/audio clip shall uniquely reveal the last authorized account from which the clip was rented or purchased.

When an asset is purchased, the purchasing manager may relate the requesting subscriber terminal to a unique account identifier. This account identifier, coupled with the date and time of the asset purchase and possibly a unique subscriber terminal identifier would be sufficient information for the forensic watermarking analysis.

This type of information is typically known in a content management system, but not by other devices in a cable headend. It may not always be possible to establish a communication link between the system and the watermarking device. It may be possible, however, that there are several different devices in the streaming media distribution chain that are capable of inserting a watermark.

Therefore there is a need in the art for session information to be placed in a content asset Motion Picture Experts Group (MPEG) single program transport stream (SPTS) instead of having one or more communication links between the above-mentioned devices and the content management system.

SUMMARY

A method for providing content in accordance with the principles of the invention may include: receiving a request from a subscriber terminal for a content asset; initiating a content session at a server to provide the content asset to the subscriber terminal; inserting identifying information indicative of the content session in a content data field of the content asset. The compressed data stream may comprise a Motion Picture Experts Group (MPEG) Single Program Transport Stream (SPTS). The content data field may comprise a PSI table including a Program Map Table (PMT). The PSI may comprise a registration descriptor, a private data indicator descriptor or a user private descriptor. The registration descriptor may contain a format_identifier that indicates the presence of the identifying information. The registration descriptor may be updated when information about the streaming session is changed. The private data indicator descriptor may include a private_data_indicator that indicates the presence of the identifying information.

In accordance with the principles of the invention a method for providing watermarking may include: receiving during a streaming session a content asset having pre-processed candidate watermark locations and a content data field, the content data field comprising identifying information for insertion in at least one of the pre-processed candidate watermark locations; extracting the identifying information from the content data field; inserting the identifying information into the pre-processed candidate watermark locations of the content asset; and streaming the content asset with the inserted identifying information to a subscriber terminal. The compressed data stream may comprise a Motion Picture Experts Group (MPEG) Single Program Transport Stream (SPTS). The content data field may comprise a PSI table including a Program Map Table (PMT). The PSI may comprise a registration descriptor, a private data indicator descriptor or a user private descriptor. The registration descriptor may contain a format_identifier that indicates the presence of the identifying information. The registration descriptor may be updated when information about the streaming session is changed. The private data indicator descriptor may include a private_data_indicator that indicates the presence of the identifying information.

In accordance with the principles of the invention a content asset may include: content; and a content data field containing identifying information indicative of content session associated with a request for distribution of the content. The content asset may be contained in a compressed data stream comprising a Motion Picture Experts Group (MPEG) Single Program Transport Stream (SPTS). The content data field may comprise a PSI table including a Program Map Table (PMT). The PSI may comprise a registration descriptor, a private data indicator descriptor or a user private descriptor. The registration descriptor may contain a format_identifier that indicates the presence of the identifying information. The registration descriptor may be updated when information about the streaming session is changed. The private data indicator descriptor may include a private_data_indicator that indicates the presence of the identifying information.

An apparatus for providing content in accordance with the principles of the invention may comprise: a content manager configured to receive a request from a subscriber terminal for a content asset; a content server configured to initiate a content session to provide the content asset to the subscriber terminal and insert identifying information indicative of the content session in a content data field of the content asset. The content asset may be provided in a compressed data stream comprising a Motion Picture Experts Group (MPEG) Single Program Transport Stream (SPTS). The content data field may comprise a PSI table including a Program Map Table (PMT). The PSI may comprise a registration descriptor, a private data indicator descriptor or a user private descriptor. The registration descriptor may contain a format_identifier that indicates the presence of the identifying information. The registration descriptor may be updated when information about the streaming session is changed. The private data indicator descriptor may include a private_data_indicator that indicates the presence of the identifying information.

An apparatus for providing watermarking in accordance with the principles of the invention may include: a watermark insertion device configured to receive during a streaming session a content asset having pre-processed candidate watermark locations and a content data field, the content data field comprising identifying information for insertion in at least one of the pre-processed candidate watermark locations; extract the identifying information from the content data field; and insert the identifying information into the pre-processed candidate watermark locations of the content asset. The content asset may be provided in a compressed data stream comprising a Motion Picture Experts Group (MPEG) Single Program Transport Stream (SPTS). The content data field may comprise a PSI table including a Program Map Table (PMT). The PSI may comprise a registration descriptor, a private data indicator descriptor or a user private descriptor. The registration descriptor may contain a format_identifier that indicates the presence of the identifying information. The registration descriptor may be updated when information about the streaming session is changed. The private data indicator descriptor may include a private_data_indicator that indicates the presence of the identifying information.

There are many possible embodiments of the present application that involve different types of session information and devices that are capable of watermarking (e.g., servers, edge-devices, set-tops, etc.). The invention allows forensic watermarking to be added to content in an upstream device based on unique information associated with a specific user request for the content. The upstream watermark insertion allows for increased efficiency and reduced cost in watermark insertion, such as by removing the need for a local user device to add watermarking information and a need for a local user device to contain a high degree of processing capability for watermark insertion. The invention allows the forensic watermarks to be made from just the information contained in the content asset itself, further eliminating additional signaling and additional communication channels to watermarking insertion devices. The invention also allows watermark insertion in a subscriber network system which includes a variety of different types of user devices with different processing capabilities.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates the PMT format syntax in accordance with the MPEG-2 standard;

FIG. 3 illustrates a registration descriptor in accordance with the MPEG-2 standard;

FIG. 4 illustrates a private data indicator descriptor in accordance with the MPEG-2 standard;

DETAILED DESCRIPTION

The present application provides a method for carrying content session information in a content asset to be used by a device that inserts a forensic watermark. A content asset may include content and content data and may be delivered in a variety of manner, including a video on demand (VOD) arrangement, IP television (IPTV), adaptive streaming, e.g. HTTP, and switched digital video (SDV). In one embodiment, session specific information is inserted as in an MPEG SPTS, and may be used by a device that inserts a forensic watermark.

Figure 1:
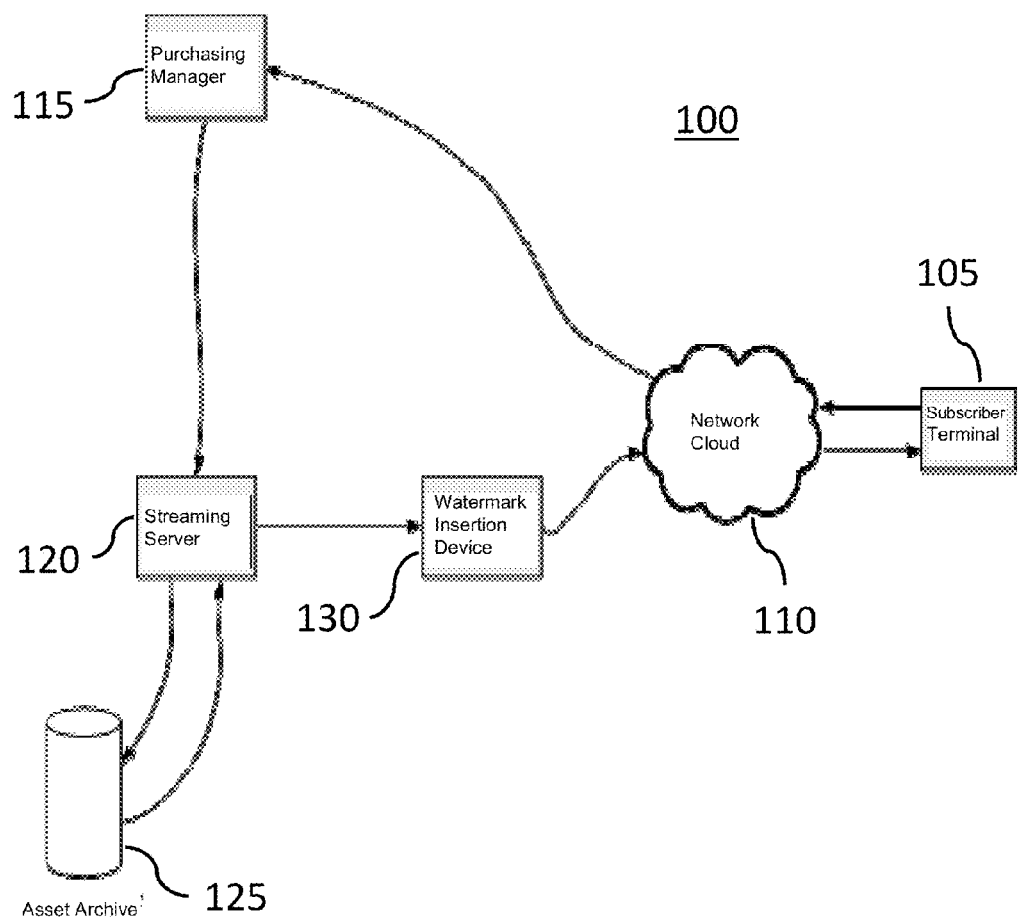
FIG. 1 illustrates an example of a content system according to one embodiment.

FIG. 1 illustrates an example of a system 100 providing session information to a watermarking device. The system comprises subscriber terminal 105, network 110, purchasing manager 115, streaming server 120, asset archive 125, and watermark insertion device 130. It should be noted that there may be more than one watermark insertion device in the content distribution system.

Subscriber terminal 105 may be a phone, set-top box, television, personal computer, laptop, and the like. Purchasing manager 115, streaming server 120, asset archive 125, and watermark insertion device 130 may be implemented either at a headend or as stand-alone devices.

The content asset is a collection of elementary streams such as video and audio and associated program information. One example of a content asset is a MPEG single program transport stream (SPTS). A content data field is a construct within the content asset that carries data related to the asset. In the context of an MPEG type SPTS, the content asset may be the SPTS including the content data field. The content data field may be, but is not limited to, Program Specific Information (PSI) table descriptors or Program Map Table (PMT) descriptors.

Subscriber terminal 105 initiates a session by sending a purchase request to purchasing manager 115 via network cloud 110.

In one embodiment, subscriber terminal 105 initiates a session by sending a purchase request to purchasing manager 115 via network cloud 110 in response to a consumer purchasing a asset. The purchase request makes its way upstream via the interactive network, e.g. cloud network 110, to purchasing Manager 115. The purchase request comprises at least an identification of the asset and an identifier of the subscriber terminal. Purchasing manager 115 provides session information that indicates the unique subscriber account and the date/time of the asset purchase to streaming server 120. Purchasing manager 115 instructs streaming server 120 to initiate streaming of the asset and sends identifying information, e.g. session information to streaming server 120 for inclusion in a Program Specific Information (PSI) table descriptor. Streaming server 120 begins to retrieve the content, e.g. a compressed asset, from asset archive 125. Identifying information is inserted in the PSI table descriptor as the compressed asset is streamed to watermark insertion device 130. Watermark insertion device 130 extracts the identifying information from the PSI table descriptor. The identifying information is inserted into preprocessed candidate watermark locations of the compressed video asset. In a preferred arrangement, the content can be encrypted and later decrypted and the watermark information will remain intact.

The watermarked, compressed asset is then streamed from watermark insertion device 130 to subscriber terminal 105 via network cloud 110.

In one embodiment, the PSI table comprises a Program Map Table (PMT). FIG. 2 shows the PMT format syntax in accordance with the MPEG-2 standard. The PMT is composed of two portions, a first portion that includes information describing the program and a second portion which describes the type of each element in the program and each PID. As shown, the first portion of the PMT includes a table ID (table_id) of eight bits, a section syntax indicator (section_syntax_indicator) of one bit, a reserve (reserved) of two bits, a section length of 12 bits, a program number (program_number) of 16 bits, a reserve (reserved) of two bits, a version number (version_number) of five bits, a current/next indicator (current_next_indicator) of eight bits, a section number (section_number) of eight bits, a last section number (last_section number) of eight bits, a reserve (reserved) of three bits, a PCR-PID (PCR PID) of 13 bits, a reserve (reserved) of four bits, and a program length (program_info_length) of 12 bits. This information describes the program. For instance, the program number (program_number)

typically corresponds to the channel on which the program is broadcast. Following the program length is a program descriptor.

The next portion of the PMT is looped and is often referred to as the elementary stream (ES) loop. Each loop represents an elementary stream included in the channel. The ES loop includes a stream type (stream_type) of eight bits, a reserve (reserved) of three bits, an elementary PID (elementary_PID) of 13 bits, a reserve (reserved) of four bits, and an ES information length (ES_info_length) of 12 bits. The ES information length describes the length of the ES Descriptor that follows. There are a plurality of ES Descriptors that may be employed in the ES loop. Some of the ES Descriptors that may be used are: a registration descriptor (registration_descriptor); a private data indicator descriptor (private_data_indicator_descriptor); and a user private identifier. MPEG recognizes that private data may sometimes need to be incorporated into a transport stream compliant with MPEG. To accommodate such private data, the MPEG program and program element descriptors are used to provide data that are outside (e.g. user private or un-dedicated fields) of those defined in MPEG.

FIG. 3 shows the syntax for the registration descriptor in accordance with the MPEG-2 standard. The fields of the registration descriptor include descriptor start (registration_descriptor), a descriptor tag (descriptor_tag) to identify the descriptor as a registration descriptor (descriptor_tag=5), a descriptor length (descriptor_length), which gives the number of bytes following the descriptor length field itself to the end of descriptor, a format identifier (format_identifier) to identify an entity that has ideally registered with a Registration Authority and which is sanctioned by ISO/IEC for MPEG specifications. The field I=0-N represents optional extra data bytes, where the value of N is given by the descriptor_length field. Finally, an additional field (additional_identification_info) provides the optional data defined by the entity represented by the format_identifier value.

The private metadata descriptor that describes the structure of the private metadata in the adaptation field may be placed in the program descriptor of the PMT, or, alternatively, in the descriptor of the video ES loop in the PMT. For instance, in some implementations a format_indicator may be defined by a value known a priori to signal a stream carrying metadata. The additional_identification_info bytes may contain a signature that a device would look for in the private metadata to verify the intent of the information, and an identifier indicating the location of the private metadata (e.g., transport stream, PES, picture).

FIG. 4 illustrates the syntax for the private data indicator descriptor in accordance with the MPEG-2 standard. The fields of the private data indicator descriptor include descriptor start (private_data_indicator_descriptor), a descriptor tag (descriptor_tag) to identify the descriptor as a private data indicator descriptor (descriptor_tag=15), a descriptor length (descriptor_length), which gives the number of bytes following the descriptor length field itself to the end of the descriptor. Finally, private data indicator bytes (private_data_indicator) may be the location for private session specific data, e.g. watermark information.

A user private identifier (not shown) may also be utilized to indicate session specific information. In this instance, a user private identifier may have a descriptor_tag within a range of 64-255.

The following example illustrates the use of a registration descriptor. Asset archive 125 has stored thereon compressed video assets that comprise MPEG single program transport streams (SPTS). As the asset is output in a MPEG single program transport stream (SPTS) from asset archive 125, server 120 inserts a registration descriptor (e.g. descriptor_tag=5) in the PMT associated with the streaming session. The registration descriptor contains a format_identifier that is reserved for session information. The session identifying information is placed in additional_identification_info bytes.

Downstream in the video distribution chain 100, watermark inserter 130 recognizes identifying information for inclusion in a watermark, e.g. a descriptor or tag in the PMT in the streamed, compressed asset. Watermark inserter 130 extracts the session specific information, e.g. identifying information, from the PMT descriptor and inserts it into the forensic watermark location that is embedded in the video/audio stream, e.g. the preprocessed candidate watermark locations. At this point, the watermark insertion device 130 may optionally remove the registration descriptor, e.g. the identifying information, from the PMT. If the descriptor is removed or modified in the PMT, a new PMT Cyclic Redundancy Check (CRC) must be computed by the watermark insertion device. The streaming content traverses the video delivery network 110 and is decoded and rendered by subscriber terminal 105.

In one embodiment, a flag in the registration descriptor may be updated if information about the session has changed. For example, time specific information may be added or modified in the descriptor. In one embodiment, there may be a need to adjust or modify the time information contained in the descriptor as the content asset traverses multiple watermark insertion devices in the content distribution system (e.g. if there is a time dependency or interval for the information). The timing information that is added or modified in the PMT descriptor is performed by a downstream watermark insertion device. The watermark insertion device must ensure the PMT CRC is accurate. As such, watermark insertion device 130 handles the CRC check.

The following example illustrates the use of a private data indicator descriptor. asset archive 125 has stored thereon compressed video assets that comprise MPEG single program transport streams (SPTS). As the asset is output in a MPEG single program transport stream (SPTS) from asset archive 125, server 120 inserts a private data indicator descriptor (e.g. descriptor_tag=15) in the PMT associated with the streaming session. The private data indicator descriptor may be reserved for session information. The session information is placed in private_data_indicator bytes. The private_data_indicator bytes are used to carry private metadata for streaming MPEG SPTS.

Downstream in the video distribution chain 100, watermark inserter 130 recognizes identifying information for inclusion in a watermark, e.g. a descriptor or tag in the PMT in the streamed, compressed asset. Watermark inserter 130 extracts the session specific information, e.g. identifying information, from the PMT descriptor and inserts it into the forensic watermark location that is embedded in the video/audio stream, e.g. the preprocessed candidate watermark locations. At this point, the watermark insertion device 130 may optionally remove the private data indicator descriptor, e.g. the identifying information, from the PMT. If the descriptor is removed or modified in the PMT, a new PMT Cyclic Redundancy Check (CRC) must be computed by the watermark insertion device. The streaming content traverses the video delivery network 110 and is decoded and rendered by subscriber terminal 105.

In one embodiment, a flag in the private data indicator descriptor may be updated if information about the session has changed. For example, time specific information may be added or modified in the descriptor. In one embodiment, there may be a need to adjust or modify the time information contained in the descriptor as the content asset traverses multiple watermark insertion devices in the content distribution system e.g. if there is a time dependency or interval for the information). The timing information that is added or modified in the PMT descriptor is performed by a downstream watermark insertion device. The watermark insertion device must ensure the PMT CRC is accurate. As such, watermark insertion device 130 handles the CRC check.

In one embodiment, a user private identifier may be reserved for session information. In this embodiment, a user private descriptor would be defined for the user private identifier. This user private descriptor would have a descriptor tag in the 64-255 range. This user private identifier may be utilized to carry session specific information in a manner similar to that of the registration descriptor and private data indicator descriptor as described above.

Figure 5:
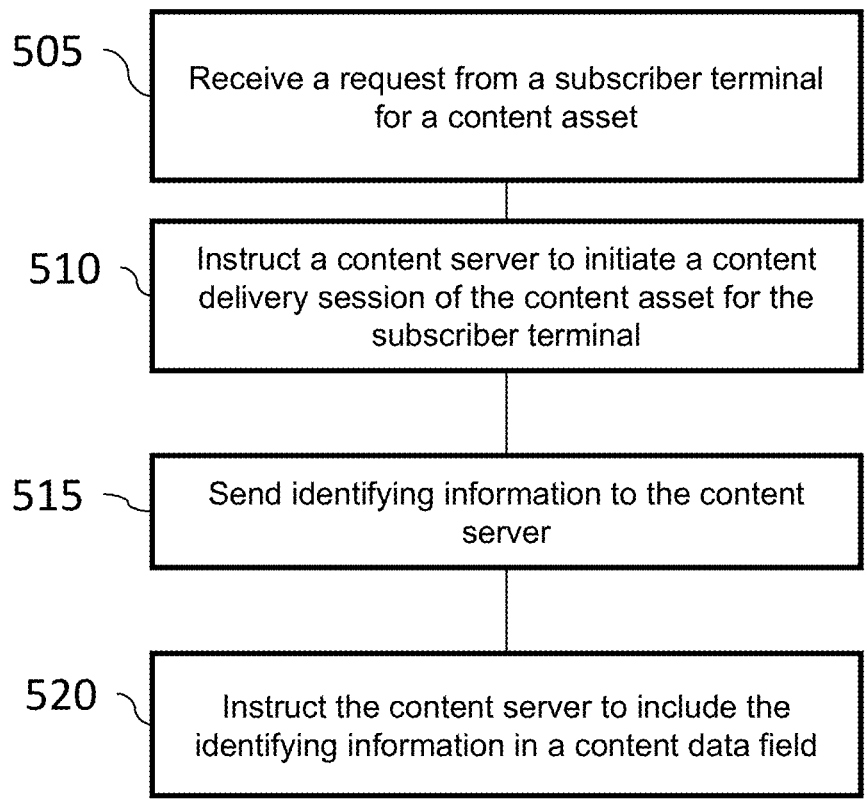
FIG. 5 illustrates a method for providing session information using a purchasing manager according to one embodiment.

FIG. 5 illustrates one embodiment of a method 500 for providing content session information, e.g. video on demand (VOD) session information, using a content manager. At step 505 a request for a content asset is received from a subscriber terminal. In one embodiment, the content asset is a compressed data stream. The request comprises at least an identification of the content asset and an identifier of the subscriber terminal.

At step 510 content manager 115 instructs streaming server 120 to initiate a content delivery session of the content asset for subscriber terminal 105. Content manager 115 provides session information that indicates at least the unique subscriber account and the date/time of the asset purchase to streaming server 120. At step 515 identifying information, e.g. session information, is sent to content server 120 by content manager 115. At step 520 content manager 115 instructs content server 120 to include the identifying information in a content data field of the content asset.

In addition to the content data field, the content asset may contain one or more other types of information, including, but not limited to audio and video. In the context of an MPEG type SPTS, the content asset may be the SPTS and the content data field may be, but is not limited to, Program Specific Information (PSI) table descriptors or a Program Map Table (PMT) descriptors.

In one embodiment, the identifying information is forensic watermark information that is derived from the request. A second device, e.g. streaming server 120, may insert the identifying information, e.g. forensic watermark information, into a content data field.

Figure 6:
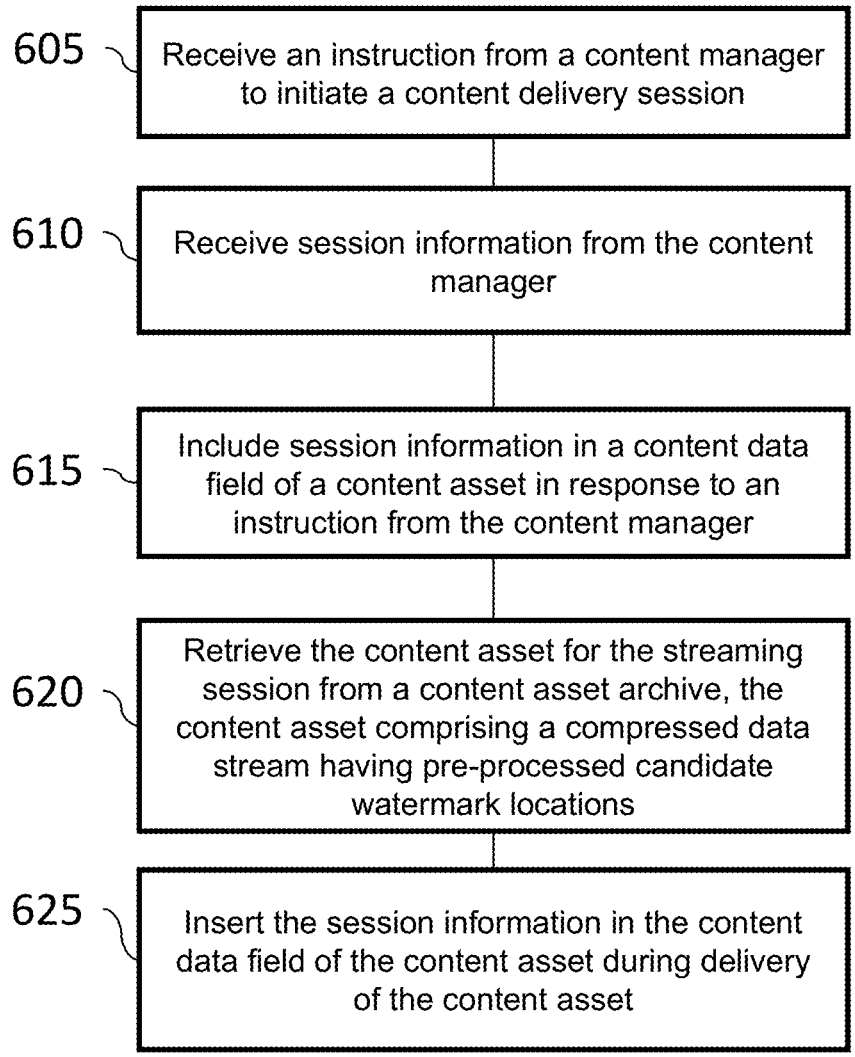
FIG. 6 illustrates a method for providing session information using a streaming server according to one embodiment.

FIG. 6 illustrates one embodiment of a method 600 for providing content session information, e.g. Video on Demand (VOD) session information, using a content server, e.g. streaming server 120. At step 605 an instruction is received from a content manager, e.g. purchasing manager 115, to initiate a content delivery session. At step 610 session information is received from content manager 115. At step 615 the session information is included in a content data field of a content asset in response to an instruction from content manager 115. At step 620, the content asset for the content delivery session is retrieved from a content asset archive, e.g. asset archive 125. The content retrieved from content asset archive 125 may be a compressed data stream. The compressed data streams stored in content asset archive 125 may be pre-processed to include one or more candidate watermark locations for insertion of identifying information by watermark insertion device 130.

Figure 7:
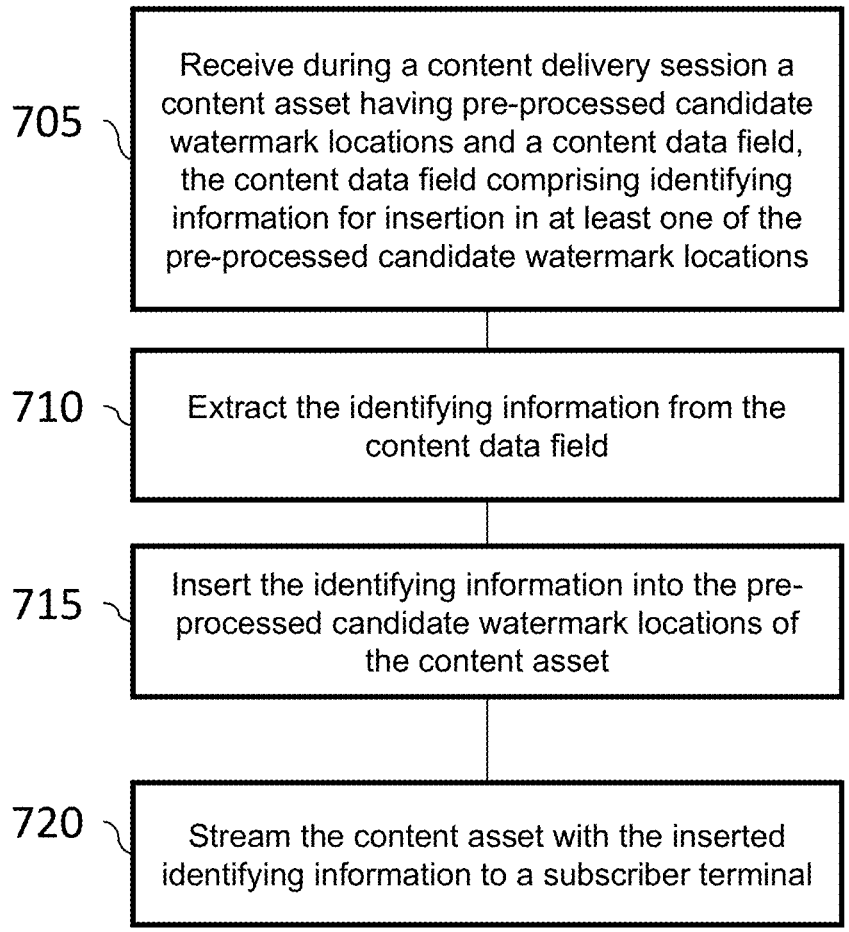
FIG. 7 illustrates a method for providing session information using a watermarking device according to one embodiment.

FIG. 7 illustrates one embodiment of a method 700 for providing session information using a watermarking device. At step 705, a content asset having pre-processed candidate watermark locations and a content data field are received during a content delivery session. The content data field contains session information, e.g. identifying information, for insertion in at least one of the pre-processed candidate watermark locations. At step 710, the identifying information is extracted from the content data field, e.g. session information located in a PSI table descriptor or PMT descriptor, by the watermark insertion device. At step 715, the identifying information is inserted into the pre-processed candidate watermark locations of the content asset. At step 720, the content asset with the inserted identifying information is streamed to a subscriber terminal.

Figure 8:
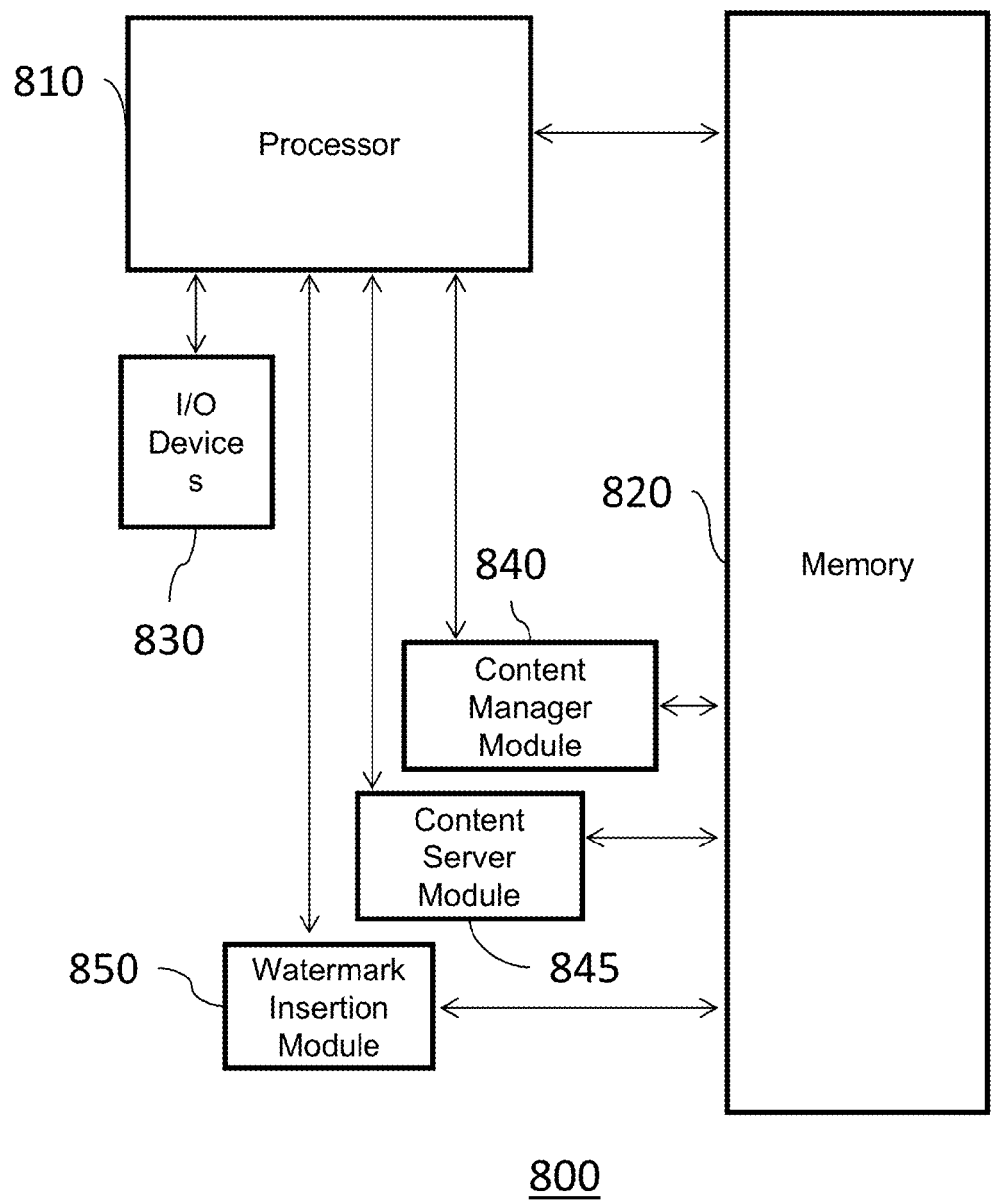
FIG. 8 illustrates an embodiment of a system in accordance with one embodiment.

FIG. 8 illustrates a block diagram of a system 800. Specifically, the system can be employed to provide session information to a watermarking device. In one embodiment, system 800 is implemented using a general purpose computer or any other hardware equivalents.

Thus, system 800 comprises a processor (CPU) 810, a memory 820, e.g., random access memory (RAM) and/or read only memory (ROM), a Content Manager module 840, a Content Server module 845, a Watermark Insertion module 850, and various input/output devices 830, (e.g., storage devices, including but not limited to, a tape drive, a floppy drive, a hard disk drive or a compact disk drive, a receiver, a transmitter, and other devices commonly required in multimedia, e.g. content delivery, system components).

It should be understood that Content Manager module 840, Content Server module 845, and Watermark Insertion module 850 can be implemented as one or more physical devices that are coupled to the CPU 810 through a communication channel. In addition, Content Manager module 840, Content Server module 845, and Watermark Insertion module 850 can each be implemented in separate devices, e.g. content manager 115, content delivery server 120, and Watermark Insertion Device 130, where each device has its own processor 810, I/O devices and memory 820. Alternatively, Content Manager module 840, Content Server module 845, and Watermark Insertion module 850, and the processes performed therein, e.g. as illustrated in FIGS. 5-7, can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 820 of the computer. As such, Content Manager module 840, Content Server module 845, and Watermark Insertion module 850 (including associated data structures) of the present invention can be stored on a computer readable medium, e.g., RAM memory, magnetic or optical drive or diskette and the like.

There are many possible embodiments of the present application that involve different types of session information and devices that are capable of watermarking (e.g., servers, edge-devices, set-tops, etc.). The invention allows forensic watermarking to be added to content in an upstream device based on unique information associated with a specific user request for the content. The upstream watermark insertion allows for increased efficiency and reduced cost in watermark insertion, such as by removing the need for a local user device to add watermarking information and a need for a local user device to contain a high degree of processing capability for watermark insertion. The invention allows the forensic watermarks to be made from just the information contained in the content asset itself, further eliminating additional signaling and additional communication channels to watermarking insertion devices. The invention also allows watermark insertion in a subscriber network system which includes a variety of different types of user devices with different processing capabilities. While the foregoing is directed to embodiments of the present invention, other and further embodiments of the invention may be devised without departing from the basic scope thereof, and the scope thereof is determined by the claims that follow.

What is claimed is:

1. A method for providing content, comprising:
receiving a request from a subscriber terminal for a content asset;
initiating a content session at a server to provide the content asset to the subscriber terminal;
inserting identifying information indicative of the content session in a content data field of the content asset, the identifying information including information indicative of a unique subscriber account associated with authorized access to the content asset;
extracting the identifying information from the content data field; and
inserting the identifying information into a candidate watermark location of the content asset.

2. The method of claim 1, wherein the compressed data stream comprises a Motion Picture Experts Group (MPEG) Single Program Transport Stream (SPTS).

3. The method of claim 1, wherein the content data field comprises a PSI table.

4. The method of claim 3, wherein the PSI table comprises a Program Map Table (PMT).

5. The method of claim 4, wherein the PSI comprises a registration descriptor, a private data indicator descriptor or a user private descriptor.

6. The method of claim 5, wherein the registration descriptor contains a format_identifier that indicates the presence of the identifying information.

7. The method of claim 5, wherein a flag in the registration descriptor is updated when information about the streaming session is changed.

8. The method of claim 5, wherein the private data indicator descriptor includes a private_data_indicator that indicates the presence of the identifying information.

9. The method of claim 1, further comprising:
extracting the identifying information from the candidate watermark location to identify the unique subscriber account.

10. A method for providing watermarking, comprising:
receiving during a streaming session a content asset having pre-processed candidate watermark locations and a content data field, the content data field comprising identifying information for insertion in at least one of the pre-processed candidate watermark locations, the identifying information including information indicative of a unique subscriber account associated with authorized access to the content asset;
extracting the identifying information from the content data field;
inserting the identifying information into a pre-processed candidate watermark location of the content asset; and
streaming the content asset with the inserted identifying information to a subscriber terminal.

11. The method of claim 10, wherein the compressed data stream comprises a Motion Picture Experts Group (MPEG) Single Program Transport Stream (SPTS).

12. The method of claim 10, wherein the content data field comprises a PSI table.

13. The method of claim 12, wherein the PSI table comprises a Program Map Table (PMT).

14. The method of claim 13, wherein the PSI comprises a registration descriptor, a private data indicator descriptor or a user private descriptor.

15. The method of claim 14, wherein the registration descriptor contains a format_identifier that indicates the presence of the identifying information.

16. The method of claim 14, wherein a flag in the registration descriptor is updated when information about the streaming session is changed.

17. The method of claim 14, wherein the private data indicator descriptor includes a private_data_indicator that indicates the presence of the identifying information.

18. The method of claim 10, further comprising:
extracting the identifying information from the candidate watermark location to identify the unique subscriber account.

19. An apparatus for providing content comprising:
a content manager configured to receive a request from a subscriber terminal for a ent asset; and
a content server configured to initiate a content session to provide the content asset to the subscriber terminal and insert identifying information indicative of the content session in a content data field of the content asset, the identifying information including information indicative of a unique subscriber account associated with authorized access to the content asset and being configured for insertion into a candidate watermark location of the content asset by a watermark insertion device.

20. The apparatus of claim 19, wherein the content asset is provided in a compressed data stream comprising a Motion Picture Experts Group (MPEG) Single Program Transport Stream (SPTS).

21. The apparatus of claim 19, wherein the content data field comprises a PSI table.

22. The apparatus of claim 21, wherein the PSI table comprises a Program Map Table (PMT).

23. The apparatus of claim 22, wherein the PSI comprises a registration descriptor, a private data indicator descriptor or a user private descriptor.

24. The apparatus of claim 23, wherein the registration descriptor contains a format_identifier that indicates the presence of the identifying information.

25. The apparatus of claim 23, wherein a flag in the registration descriptor is updated when information about the streaming session is changed.

26. The apparatus of claim 23, wherein the private data indicator descriptor includes a private_data_indicator that indicates the presence of the identifying information.

27. An apparatus for providing watermarking comprising:
a watermark insertion device configured to
receive during a streaming session a content asset having pre-processed candidate watermark locations and a content data field, the content data field comprising identifying information for insertion into at least one of the pre-processed candidate watermark locations, the identifying information including information indicative of a unique subscriber account associated with authorized access to the content asset;
extract the identifying information from the content data field; and
insert the identifying information into at least one of the pre-processed candidate watermark locations of the content asset.

28. The apparatus of claim 27, wherein the content asset is provided in a compressed data stream comprising a Motion Picture Experts Group (MPEG) Single Program Transport Stream (SPTS).

29. The apparatus of claim 27, wherein the content data field comprises a PSI table.

30. The apparatus of claim 29, wherein the PSI table comprises a Program Map Table (PMT).

31. The apparatus of claim 30, wherein the PSI comprises a registration descriptor, a private data indicator descriptor or a user private descriptor.

32. The apparatus of claim 31, wherein the registration descriptor contains a format_identifier that indicates the presence of the identifying information.

33. The apparatus of claim 31, wherein a flag in the registration descriptor is updated when information about the streaming session is changed.

34. The apparatus of claim 31, wherein the private data indicator descriptor includes a private_data_indicator that indicates the presence of the identifying information.

* * * * *

UNITED STATES PATENT AND TRADEMARK OFFICE
CERTIFICATE OF CORRECTION

| | |
|---|---|
| PATENT NO. | : 8,886,945 B2 |
| APPLICATION NO. | : 12/971161 |
| DATED | : November 11, 2014 |
| INVENTOR(S) | : Mark E. Gregotski |

It is certified that error appears in the above-identified patent and that said Letters Patent is hereby corrected as shown below:

In the Claims

Column 10, Line 19, for claim 19, the text "a ent" should be deleted and corrected to --content--

Signed and Sealed this
Twenty-ninth Day of December, 2015

Michelle K. Lee
*Director of the United States Patent and Trademark Office*